United States Patent
Rojo et al.

(10) Patent No.: US 11,703,319 B2
(45) Date of Patent: Jul. 18, 2023

(54) METHOD TO DETERMINE PROPERTIES OF A COATING ON A TRANSPARENT FILM, METHOD FOR MANUFACTURING A CAPACITOR FILM AND DEVICE TO DETERMINE PROPERTIES OF A COATING ON A TRANSPARENT FILM

(71) Applicant: TDK Electronics AG, Munich (DE)

(72) Inventors: Ramón García Rojo, Málaga (ES); Fernando Ferrer, Málaga (ES); Gustavo Sánchez, Seville (ES)

(73) Assignee: TDK Electronics AG, Munich (DE)

( * ) Notice: Subject to any disclaimer, the term of this patent is extended or adjusted under 35 U.S.C. 154(b) by 423 days.

(21) Appl. No.: 16/651,919

(22) PCT Filed: Nov. 22, 2018

(86) PCT No.: PCT/EP2018/082187
§ 371 (c)(1),
(2) Date: Mar. 27, 2020

(87) PCT Pub. No.: WO2019/101845
PCT Pub. Date: May 31, 2019

(65) Prior Publication Data
US 2020/0326177 A1    Oct. 15, 2020

(30) Foreign Application Priority Data

Nov. 23, 2017 (ES) ................................. 201731357
Feb. 13, 2018 (DE) ..................... 10 2018 103 171.8

(51) Int. Cl.
*G01N 21/59* (2006.01)
*G01B 11/06* (2006.01)
(Continued)

(52) U.S. Cl.
CPC ...... *G01B 11/0625* (2013.01); *G01B 11/0691* (2013.01); *G01N 21/59* (2013.01);
(Continued)

(58) Field of Classification Search
CPC ............ G01B 11/0625; G01B 11/0691; G01N 21/59; G01N 21/8422; G01N 21/86;
(Continued)

(56) References Cited

U.S. PATENT DOCUMENTS 3,557,378 A    1/1971 Anger
4,885,709 A *  12/1989 Edgar .................... G01B 11/06
                                                    702/30
(Continued)

FOREIGN PATENT DOCUMENTS

CN    1269905 A    10/2000
CN    106546602 A   3/2017
(Continued)

OTHER PUBLICATIONS

Liu et al., "Pesticide Commodity Quality Inspection," Pesticide Commodity Science, Shanghai Science and Technology Presse, May 31, 1991, 12 pages (Partial Translation of Relevant Paragraph).

*Primary Examiner* — Isiaka O Akanbi
(74) *Attorney, Agent, or Firm* — Slater Matsil, LLP

(57) ABSTRACT

A method for determining properties of a coating on a transparent film, a method for manufacturing a capacitor film and a device configured to determine properties of a coating on a transparent film are disclosed. In an embodiment a method includes moving the transparent film with the coating on a path which passes between a light source and a sensor, illuminating, by the light source, the coating on the transparent film, detecting, by the sensor, an intensity of transmitted light from the light source and calculating, by a
(Continued)

processor, the properties of the coating on the transparent film based on the detected intensity of transmitted light.

18 Claims, 1 Drawing Sheet

(51) Int. Cl.
  G01N 21/84 (2006.01)
  G01N 21/86 (2006.01)
  H01G 4/00 (2006.01)
(52) U.S. Cl.
  CPC ......... *G01N 21/8422* (2013.01); *G01N 21/86* (2013.01); *H01G 4/00* (2013.01); *G01N 2021/8427* (2013.01); *G01N 2021/8438* (2013.01)
(58) Field of Classification Search
  CPC ... G01N 2021/8427; G01N 2021/8438; G01N 21/5911; H01G 4/00
  USPC .................................................. 356/630–635
  See application file for complete search history.

(56) References Cited

U.S. PATENT DOCUMENTS

| | | | |
|---|---|---|---|
| 5,091,647 A | 2/1992 | Carduner et al. | |
| 5,185,645 A | 2/1993 | Sartorius et al. | |
| 5,250,811 A * | 10/1993 | Lippert | G01N 21/3559 250/359.1 |
| 5,533,139 A * | 7/1996 | Parker | H04N 5/353 250/559.07 |
| 6,128,087 A * | 10/2000 | Meredith, Jr. | C23C 14/56 118/712 |
| 6,252,237 B1 * | 6/2001 | Ramthun | G01B 11/0658 250/559.27 |
| 6,263,291 B1 * | 7/2001 | Shakespeare | G01N 21/89 356/429 |
| 6,441,375 B1 | 8/2002 | Joseph et al. | |
| 7,542,152 B2 * | 6/2009 | Takeda | G01B 11/0633 356/432 |
| 9,859,584 B2 | 1/2018 | Kabetani et al. | |
| 2002/0160100 A1 | 10/2002 | Sarbacher et al. | |
| 2003/0047135 A1 * | 3/2003 | Kansakoski | G01N 21/3563 118/665 |
| 2003/0193672 A1 * | 10/2003 | Okada | G01N 21/8422 356/630 |
| 2010/0033735 A1 | 2/2010 | Sakai et al. | |
| 2010/0214564 A1 * | 8/2010 | Kim | G01N 21/896 356/337 |
| 2011/0194113 A1 * | 8/2011 | Sakai | G01B 11/30 356/432 |
| 2013/0050687 A1 | 2/2013 | Aizenberg | |
| 2015/0323309 A1 | 11/2015 | Kabetani et al. | |
| 2016/0041090 A1 | 2/2016 | Kimura et al. | |
| 2016/0099388 A1 * | 4/2016 | Jung | H01L 33/54 438/16 |
| 2019/0011251 A1 * | 1/2019 | Moeller | G01B 11/0691 |
| 2019/0011252 A1 * | 1/2019 | Moeller | B05C 21/00 |

FOREIGN PATENT DOCUMENTS

| | | | | |
|---|---|---|---|---|
| DE | 4325590 A1 | 2/1995 | | |
| EP | 0548582 A | 6/1993 | | |
| EP | 0422017 B1 | 9/1997 | | |
| GB | 2016678 A | 9/1979 | | |
| GB | 2016678 A | * 9/1979 | ......... | G01B 11/0625 |
| JP | S589362 A | 1/1983 | | |
| JP | H0262236 A | 3/1990 | | |
| JP | H05249034 A | 9/1993 | | |
| JP | H08304032 A | 11/1996 | | |
| JP | 2625949 B2 | 7/1997 | | |
| JP | 2000105201 A | 4/2000 | | |
| JP | 2002168782 A | 6/2002 | | |
| JP | 2007285810 A | 11/2007 | | |
| JP | 2007305718 A | 11/2007 | | |
| JP | 2017161549 A | 9/2017 | | |
| KR | 101490665 B1 | 2/2015 | | |
| WO | 9625645 A1 | 8/1996 | | |
| WO | 2017098053 A1 | 6/2017 | | |

\* cited by examiner

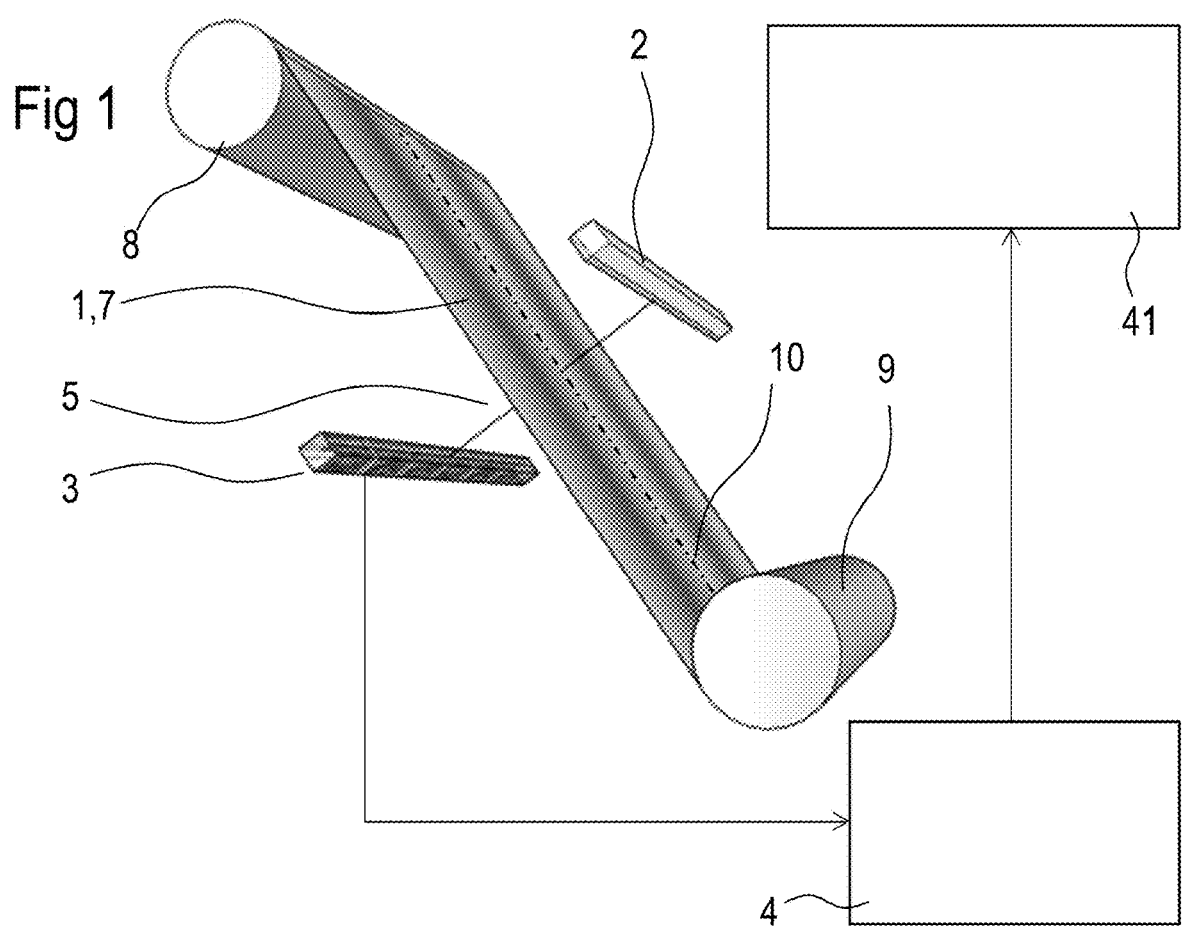
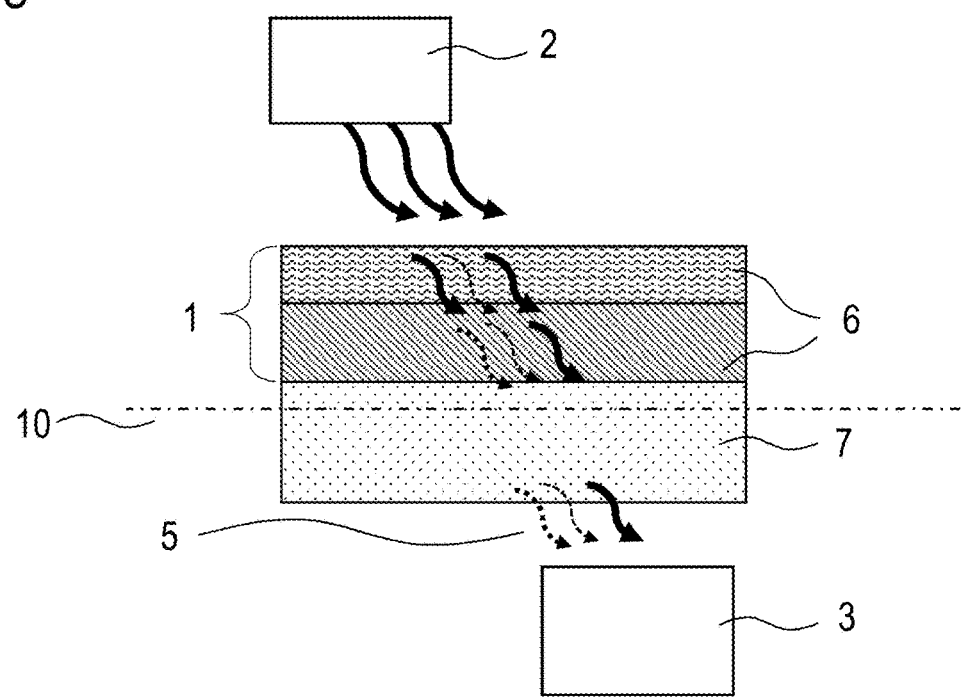

METHOD TO DETERMINE PROPERTIES OF A COATING ON A TRANSPARENT FILM, METHOD FOR MANUFACTURING A CAPACITOR FILM AND DEVICE TO DETERMINE PROPERTIES OF A COATING ON A TRANSPARENT FILM

This patent application is a national phase filing under section 371 of PCT/EP2018/082187, filed Nov. 22, 2018, which claims the priority of German patent application 102018103171.8, filed Feb. 13, 2018, which claims the priority of Spanish patent application 201731357, filed Nov. 23, 2017, each of which is incorporated herein by reference in its entirety.

TECHNICAL FIELD

The invention concerns a method to determine properties of a coating on a transparent film, a method for manufacturing a capacitor film and a device to determine properties of a coating on a transparent film for a better confirmability.

BACKGROUND

For a better control of final product quality, it is important to know the exact properties of a product during the production process. Especially in the sector of thin film production in which a layer of a compound is coated on a thin substrate, it is important to measure thickness and element ratios of the coated layers just in time with the production process.

SUMMARY OF THE INVENTION

Embodiments provide a fast and reliable method to determine properties of a coating on a transparent film. Further embodiments provide a non-destructive method to determine the ratios of several elements in a multilayer coated film on a thin substrate during a production process. Yet other embodiments provide a device for performing the above-mentioned method.

Embodiments relate to a first method. It is a method to determine properties of a coating on a transparent film for a capacitor. The method uses a structure comprising a light source, a sensor and a central process unit. The method includes the following steps to determine properties of a coating on a transparent film: Moving the transparent film with the coating on a path which passes between the light source and the sensor, Illuminating the coating on the transparent film by the light source, Detecting the intensity of the transmitted light from the light source by the sensor, and calculating the properties of the coating on the transparent film based on the measured intensity of transmitted light by the process unit.

Therein the coating can be comprise a metal or consist of metal. Nevertheless, embodiments are not limited to such a metallization.

Such a structure can allow a determination of properties during a production process, since the path can be a part of a production line. Furthermore no comparison with reference data may be needed, since all results are calculated. Therefore the calculation may save a lot of time and accelerates the process of determination.

In a possible embodiment, the light source emits light of multiple wavelengths of the electromagnetic spectrum which is used to illuminate the coating on the transparent film. Therein the wavelength of the emitted light can be in a range from 10 nm to 10 µm. A further limitation of the range to the optical spectra is possible. The optical spectra can be defined by light with multiple wavelengths in the range from 380 nm to 780 nm. The use of light of multiple wavelengths allows determining not only the thickness of the coating but other properties also, for example, the content of a certain element in the coating.

In a further embodiment, the method comprises a step of performing a sweep in the frequency of the emitted light. The sweep can be performed for frequencies that relate to every wavelength of a range of wavelengths provided by the light source, or partly sub-ranges of those.

The sweep of frequencies can be used to determine one or more optimal wavelengths of light. The optimal wavelength can be defined by the behaviour of an attenuation coefficient of a material of interest in the coating. In a more specific way an optimal wavelength can be defined as that one at which the attenuation coefficient becomes maximal for the material of interest in the coating. Furthermore, it can be part of the definition of an optimal wavelength that attenuation coefficients of materials differs from each other and the difference is maximal at this wavelength, in a case of several materials of interest.

In one embodiment, the sensor can be configured to detect light from the light source in the range of emitted wavelengths by the light source. The sensor can be configured to detect the intensity of the light reaching the detector. It can be possible that only a part of the range of emitted wavelengths by the light source can be detected by the sensor, due to its characteristics. It can be possible that at least all optimal wavelengths are detectable for the sensor. The sensor can be implemented as a photo diode or a line camera. The measurement of light intensities of multiple wavelengths can improve the accuracy of the results, particularly in a case of a multilayer coating.

In another embodiment the method is characterised in that the coating on the transparent film comprises more than one layer. Each layer of the coating on the transparent film can comprise one or more materials. The method can be characterised in that the thickness of each layer is calculated by the central process unit as a property of the coating on the transparent film. Furthermore, it can be possible to calculate the content of each material by the central process unit as a property of the coating on the transparent film.

All or at least one calculation by the central process unit can base on the Beer's law. Beer's law describes the dependency of a light absorbance A by transmitting the light through a material with a specific material attenuation coefficient $c\varepsilon$, a certain concentration C, and a length l of the path of the transmitted light. The dependency of the light absorbance is described to: $A=\varepsilon \cdot C \cdot l$ A possible embodiment can comprise a metal as a material of interest. In a more specific variation of the coating the material of interest can comprise at least one element out of Al, Zn, Cu, or Mg. It is also possible that the transparent film comprises a polymer.

In one embodiment, the method is performed in a vacuum. Therein the maximal pressure of the vacuum can be in a range from $10^{-2}$ mbar to $10^{-6}$ mbar, e.g., a vacuum with a pressure of at least $10^{-4}$ mbar.

In a further embodiment, the first step of moving the transparent film with the coating is realized by unwinding the transparent film from a first roll and simultaneous up winding the transparent film on a second roll. Therein the path of the moving transparent film between the two rolls can be partly lead between the light source and the sensor. Furthermore it can be possible that the method to determine properties of a coating on a transparent film is part of a production line. Therein it can be possible to log the calculated data in real time or use the data to regulate any production procedures.

Furthermore, embodiments relate to a second method. This is a method for manufacturing a capacitor film. The method uses a structure comprising a light source, a sensor, and a central process unit. The method for manufacturing a capacitor comprises the followed steps: Coating of metal on a transparent film, moving the coating on the transparent film on a path which passes between the light source and the sensor, illuminating the coating on the transparent film by the light source, detection of the intensity of the transmitted light from the light source by the sensor, calculation of properties of the coating on the transparent film based on the measured intensity of transmitted light by the central process unit, adapting the coating process of the first step based on the calculated properties from the step bevor.

In addition, embodiments relate to a device to determine properties of a coating on a transparent film. The device comprises a light source which is configured to illuminate the coating on the transparent film, a sensor which is configured to detect the transmitted light intensity through the coating on the transparent film, a central process unit which is configured to calculate the properties of the coating on the transparent film based on the measured intensity of transmitted light which is depending on the wavelength of the light.

The embodiments of the method for manufacturing a capacitor or the embodiments of the device to determine properties of a coating on a transparent film can be combined with any embodiments of the first method. In specific, any possible feature of the method to determine properties of a coating on a transparent film (1) for a capacitor can be a feature of the method for manufacturing a capacitor too.

BRIEF DESCRIPTION OF THE DRAWINGS

In the following, the invention and preferred embodiments of the invention are discussed with respect to the figures.

In the figures:
FIG. 1 shows a schematic overview of the device or structure; and
FIG. 2 is a sectional view perpendicular to the path of the film.

DETAILED DESCRIPTION OF ILLUSTRATIVE EMBODIMENTS

In FIG. 1 a schematic overview of a structure is shown. The structure is used to determine properties of a coating 1 on a transparent film 7 and comprises a light source 2, a sensor 3 and a central process unit 4. Between the light source 2 and the senor 3 a path 10 is defined. On this path 10 the coating 1 on the transparent film 7 is lead from a first roll 8 to a second roll 9.

Therein the coating 1 can be comprise a metal or consist of metal. In this case the coating 1 would represent a metallization on the transparent film 7. Nevertheless, the embodiments are not limited to such a metallization.

The light of the light source 2 can comprise multiple wave lengths and is directed on the coating 1 on the transparent film 7 to illuminate the same. The wavelength of the light can be in a range from 10 nm to 10 µm. In one embodiment the wavelength of the light can be in the optical spectra. The optical spectra can be defined as a range from 380 nm to 780 nm. Related to the multiple wavelengths emitted by the light source 2, the sensor 3 is chosen to detect light in the complete range or in parts out of the range of wavelengths of emitted light by the light source 2. The sensor is a photo diode or a line scan camera.

The transmitted light 5 is detected by the sensor 3 after transition through the coating 1 on the transparent film 7. The intensity of the transmitted light 5 is detected for each wavelength emitted by the light source. The sensor 3 is connected to the central process unit 4. The central process unit 4 calculates properties of the coating 1 on the transparent film 7, based on the detected intensity of transmitted light 5. Those properties can be thickness or composition of a coated layer 6 of the coating 1 on the transparent film 7. The results of the calculation can be logged as data for quality control in a subsequent process 41. Furthermore, in the subsequent process 41, the calculated results can be used for a dynamic adapting of a coating process of a transparent film 7, in order to achieve the coating 1 on the transparent film 7. Thereby the amount of a specific component of the coating or the amount of the coating to a layer 6 on the transparent film 7 can be adapted to a reference input variable.

FIG. 2 is a sectional view of the schematic view of a part of the coating 1 on the transparent film 7, the light source 2 and the sensor 3. The direction of view is perpendicular to a surface normal of the coating 1 on the transparent film 7 and perpendicular to the path 10. There, the coating 1 on the transparent film 7 is shown on the path 10 which leads through between the light source 2 and the sensor 3.

The coating 1 on the transparent film 7 is illuminated by the light source 2. The light source 2 emits multiple wavelengths as described above. The coating 1 on the transparent film 7 can consist of a transparent film 7 coated with several layers 6 with different compounds. In one aspect the transparent film 7 is a polymer film. By passing through a layer 6 the intensity of light gets reduced, depending on the layer thickness, the content of a specific material in the layer 6 and the wavelength dependent attenuation coefficient of this material, according to Beer's law.

Each layer 6 can comprise different kinds of elements. Those elements can be metals. For example, each layer 6 can comprise one or more elements out of Al, Zn, Cu, Ag, or Mg. The transparent film 7 may reduce the intensity of the transmitted light 5, too. The light source and the sensor are arranged in a way, that the transmitted light can reach the sensor 3 and be detected by the sensor 3. The sensor 3 detects the transmitted light 5. In one embodiment, the sensor 3 detects the intensity of the transmitted light 5 in dependency of the wavelength of the light.

The information about the detected light intensity can be send to the central process unit 4. The central process unit 4 can use the information to calculate properties of the coating 1 on the transparent film 7. The calculation of the properties base on Beer's law. The calculation on the basis of Beer's law allows determining a closed set of equations and therefore no need to compare with pre-existing spectrum or data is given.

To minimize errors in the calculations, it is an advantage to find an optimal wavelength of light for each used material of interest. This optimal wavelength is characterized by the wavelength dependent attenuation coefficient of the used material of interest. The wavelength should be chosen in a way that the attenuation coefficient becomes maximal. Furthermore the wavelength should be chosen in a way that the difference of between different attenuation coefficients of different materials becomes maximal for the given wavelength. That increases the precision of relative composition measurement as an example. Such an optimal wavelength can be determined by an initial frequency sweep of the light.

According to the absorbance equation of Beer's Law:

$A = \varepsilon \cdot C \cdot l$

Therein A relates to a light absorbance which is direct proportional to a material attenuation coefficient e, a material concentration C and a length of the light path l trough the material.

In the case of metal coatings, the amount of material can be expressed by the product C·l. As the material attenuation coefficient is a property of each material for a particular wavelength, it is possible to determine the metal quantity of the coating by measuring the light absorbance. In case of several metals, the light absorbance shall be measured at several wavelengths to create a system of equations in which the number of equations n will be the same or higher than the number of metals to measure and wavelengths of the measurement;

$A_1 = \varepsilon_1^{metal1} \cdot C^{metal1} \cdot l^{metal1} + \varepsilon_1^{metal2} \cdot C^{metal2} \cdot l^{metal2} + \ldots + \varepsilon_1^{metaln} \cdot C^{metaln} \cdot l^{metaln}$ $A_2 = \varepsilon_2^{metal1} \cdot C^{metal1} \cdot l^{metal1} + \varepsilon_2^{metal2} \cdot C^{metal2} \cdot l^{metal2} + \ldots + \varepsilon_2^{metaln} \cdot C^{metaln} \cdot l^{metaln}$ $A_n \varepsilon_n^{metal1} \cdot C^{metal1} \cdot l^{metal1} + \varepsilon_n^{metal2} \cdot C^{metal2} \cdot l^{metal2} + \ldots + \varepsilon_n^{metaln} \cdot C^{metaln} \cdot l^{metaln}$

The invention claimed is:

1. A method for determining a property of a coating on a transparent film, the method comprising:
   moving the transparent film with the coating on a path which passes between a light source and a sensor, wherein the coating is a metallization;
   illuminating, by the light source, the coating on the transparent film;
   detecting, by the sensor, an intensity of transmitted light from the light source, wherein the light source performs a sweep in a frequency of emitted light;
   determining, by a processor, a wavelength that is optimal with respect to a material of the coating based on the intensity of the transmitted light over a frequency range of the sweep, wherein the wavelength is an optimal wavelength when an attenuation coefficient of the material is maximal or when, in case the coating comprises at least two different materials, a difference in the attenuation coefficient of the two materials is maximal for the wavelength; and
   calculating, by the processor, a composition of the coating on the transparent film based on the detected intensity of the transmitted light.

2. The method according to claim 1, wherein illuminating the coating comprises emitting, by the light source, light of multiple wavelengths of an electromagnetic spectra.

3. The method according to claim 1, wherein illuminating the coating comprises emitting, by the light source, light in a range of an optical spectra.

4. The method according to claim 1, wherein the coating on the transparent film comprises more than one layer.

5. The method according to claim 1, further comprising calculating a thickness of each layer.

6. The method according to claim 1, wherein the coating on the transparent film comprises more than one material.

7. The method according to claim 1, further comprising calculating a content of each material in the coating on the transparent film.

8. The method according to claim 1, wherein the coating on the transparent film comprises at least one element out of Al, Zn, Cu, Ag, or Mg.

9. The method according to claim 1, further comprising calculating the property based on Beer's law.

10. The method according to claim 1, whereby moving the transparent film comprises unwinding the coating on the transparent film from a first roll and simultaneous up winding the coating on the transparent film on a second roll in a production line.

11. A method for manufacturing a capacitor film, the method comprising:
    forming a coating of a metal on a transparent film;
    moving the transparent film with the coating on a path that passes between a light source and a sensor;
    illuminating, by the light source, the coating on the transparent film;
    detecting, by the sensor, an intensity of transmitted light from the light source, wherein the light source performs a sweep in a frequency of emitted light;
    determining, by a processor, a wavelength that is optimal with respect to a material of the coating based on the intensity of the transmitted light over a frequency range of the sweep, wherein the wavelength is an optimal wavelength when an attenuation coefficient of the material is maximal or when, in case the coating comprises at least two different materials, a difference in the attenuation coefficient of the two materials is maximal for the wavelength;
    calculating, by the processor, a composition of the coating on the transparent film based on the detected intensity of the transmitted light; and
    adapting formation of the coating of the metal on the transparent film based on calculating the composition of the coating,
    wherein the coating on the transparent film is the capacitor film.

12. A device comprising:
    a light source configured to:
      illuminate a coating on a transparent film, wherein the coating is a metallization; and
      perform a sweep in a frequency of emitted light;
    a sensor configured to detect transmitted light intensity through the coating on the transparent film; and
    a processor configured to:
      determine a wavelength that is optimal with respect to a material of the coating based on the intensity of the transmitted light over a frequency range of the sweep, wherein the wavelength is an optimal wavelength when an attenuation coefficient of the material is maximal or when, in case the coating comprises at least two different materials, a difference in the attenuation coefficient of the two materials is maximal for the wavelength; and
      calculate a composition of the coating on the transparent film based on the detected intensity of the transmitted light which depends on the wavelength of the transmitted light.

13. The device according to claim 12, wherein the coating on the transparent film comprises at least one element out of Al, Zn, Cu, Ag, or Mg.

14. The device according to claim 12, wherein the coating on the transparent film comprises at least Al.

15. The device according to claim 12, wherein the coating on the transparent film comprises at least Zn.

16. The device according to claim 12, wherein the coating on the transparent film comprises at least Cu.

17. The device according to claim 12, wherein the coating on the transparent film comprises at least Ag.

18. The device according to claim 12, wherein the coating on the transparent film comprises at least Mg.

\* \* \* \* \*